United States Patent
Aldridge

[11] Patent Number: 5,876,071
[45] Date of Patent: Mar. 2, 1999

[54] QUICK CONNECT/DISCONNECT CONNECTOR AND METHOD FOR USE

[76] Inventor: James H. Aldridge, 31 Richards Pl., Battle Creek, Mich. 49015

[21] Appl. No.: 687,635

[22] Filed: Jul. 26, 1996

Related U.S. Application Data

[60] Provisional application No. 60/001,726 Jul. 28, 1996.

[51] Int. Cl.$^6$ ..................................... F16L 37/12
[52] U.S. Cl. .......................... 285/321; 285/305; 285/308
[58] Field of Search ..................... 285/924, 305, 285/321, 308, 330; 403/104, 109; 24/270, 203, 26, 19

[56] References Cited

U.S. PATENT DOCUMENTS

| | | | |
|---|---|---|---|
| 738,503 | 9/1903 | Waters | 285/321 |
| 2,388,056 | 10/1945 | Hendricks . | |
| 3,129,777 | 4/1964 | Haspart | 285/321 |
| 3,151,891 | 10/1964 | Sanders . | |
| 3,194,316 | 7/1965 | Faulkner . | |
| 3,314,696 | 4/1967 | Ferguson . | |
| 3,326,580 | 6/1967 | Munier et al. | 285/321 |
| 3,453,005 | 7/1969 | Foults | 285/924 |
| 3,534,988 | 10/1970 | Lindsey . | |
| 3,574,359 | 4/1971 | Klein | 285/924 |
| 3,584,902 | 6/1971 | Vyse | 285/924 |
| 3,603,619 | 9/1971 | Bengesser | 285/321 |
| 3,847,392 | 11/1974 | Horwinski . | |
| 3,929,357 | 12/1975 | DeVincent et al. | 285/924 |
| 3,958,819 | 5/1976 | Tifft . | |
| 4,071,266 | 1/1978 | Mountford . | |
| 4,083,410 | 4/1978 | Anderson . | |
| 4,087,120 | 5/1978 | Rumble . | |
| 4,340,082 | 7/1982 | Straus . | |
| 4,378,187 | 3/1983 | Fullerton . | |
| 4,417,626 | 11/1983 | Hansen . | |
| 4,635,974 | 1/1987 | Moussaian . | |
| 4,657,425 | 4/1987 | Takahashi . | |
| 4,783,100 | 11/1988 | Klein . | |
| 4,802,700 | 2/1989 | Stevenson et al. . | |
| 4,805,943 | 2/1989 | Balsells . | |
| 4,813,716 | 3/1989 | Lalikos et al. . | |
| 4,906,031 | 3/1990 | Vyse . | |
| 5,002,318 | 3/1991 | Witter . | |
| 5,098,241 | 3/1992 | Aldridge et al. . | |
| 5,226,682 | 7/1993 | Marrison et al. . | |
| 5,584,512 | 12/1996 | Carstensen | 285/321 |

FOREIGN PATENT DOCUMENTS

| | | | |
|---|---|---|---|
| 0 014 094 | 8/1980 | European Pat. Off. . | |
| 0 163 992 | 5/1985 | European Pat. Off. . | |
| 1 945 627 | 3/1970 | Germany . | |
| 2650370 | 5/1977 | Germany | 285/321 |

Primary Examiner—Eric K. Nicholson
Attorney, Agent, or Firm—Weiner & Burt, P. C.; Irving M. Weiner; Pamela S. Burt

[57] ABSTRACT

A quick connect/disconnect coupler has telescoping male and female members which engage along an axial dimension in response to an engaging force. The members are secured in their engaged position by a a pair of springs which mechanically couple to the respective members and limits their relative axial displacement. Upon release of the springs, the members readily disconnect by separating in response to a disengaging force. A method for use is also disclosed.

4 Claims, 3 Drawing Sheets

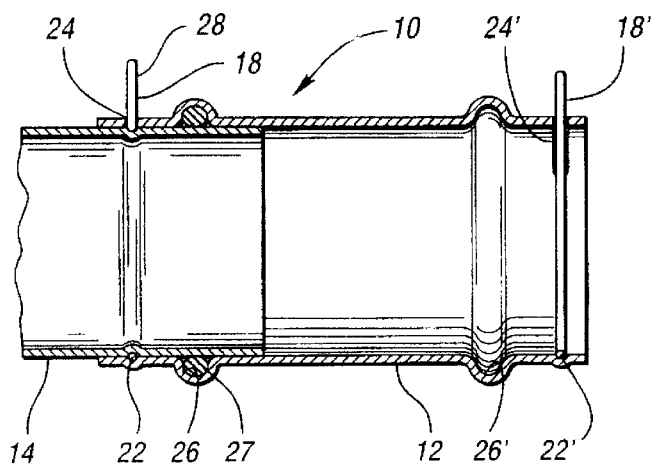
*Fig. 1*
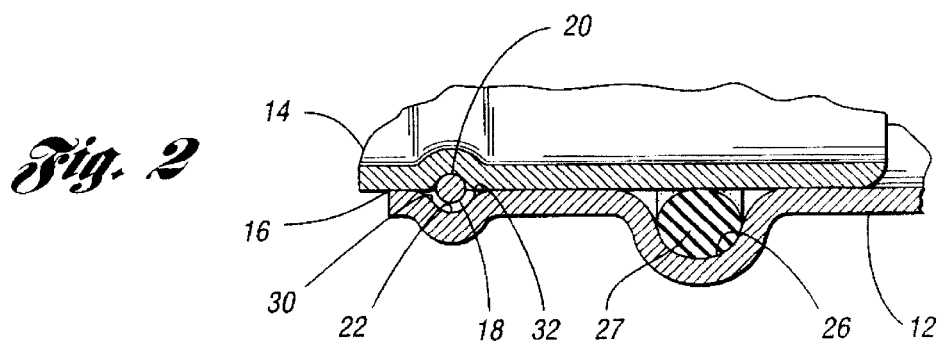
*Fig. 2*
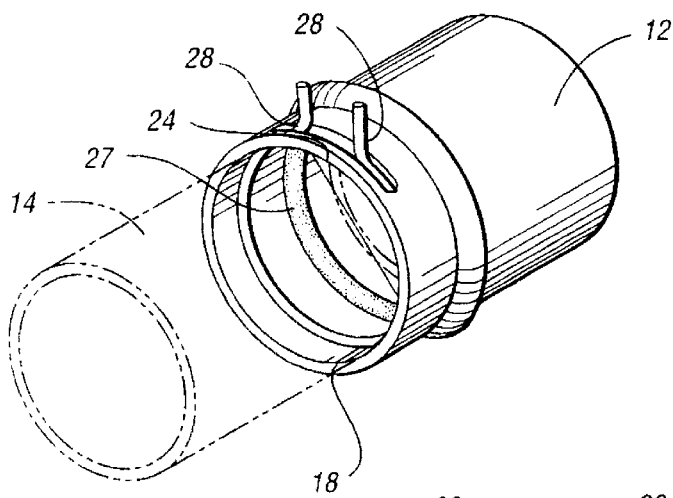
*Fig. 3*
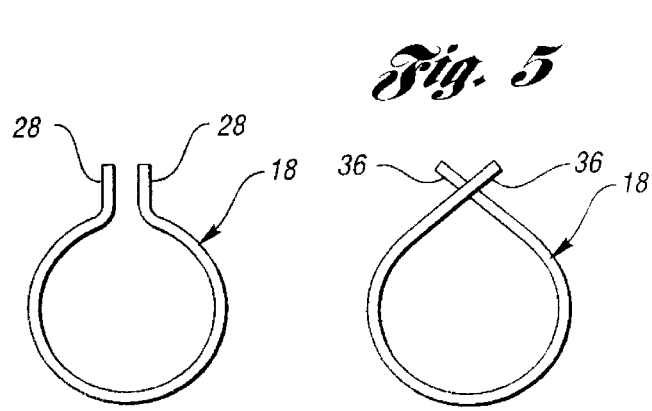
*Fig. 5*
*Fig. 4*

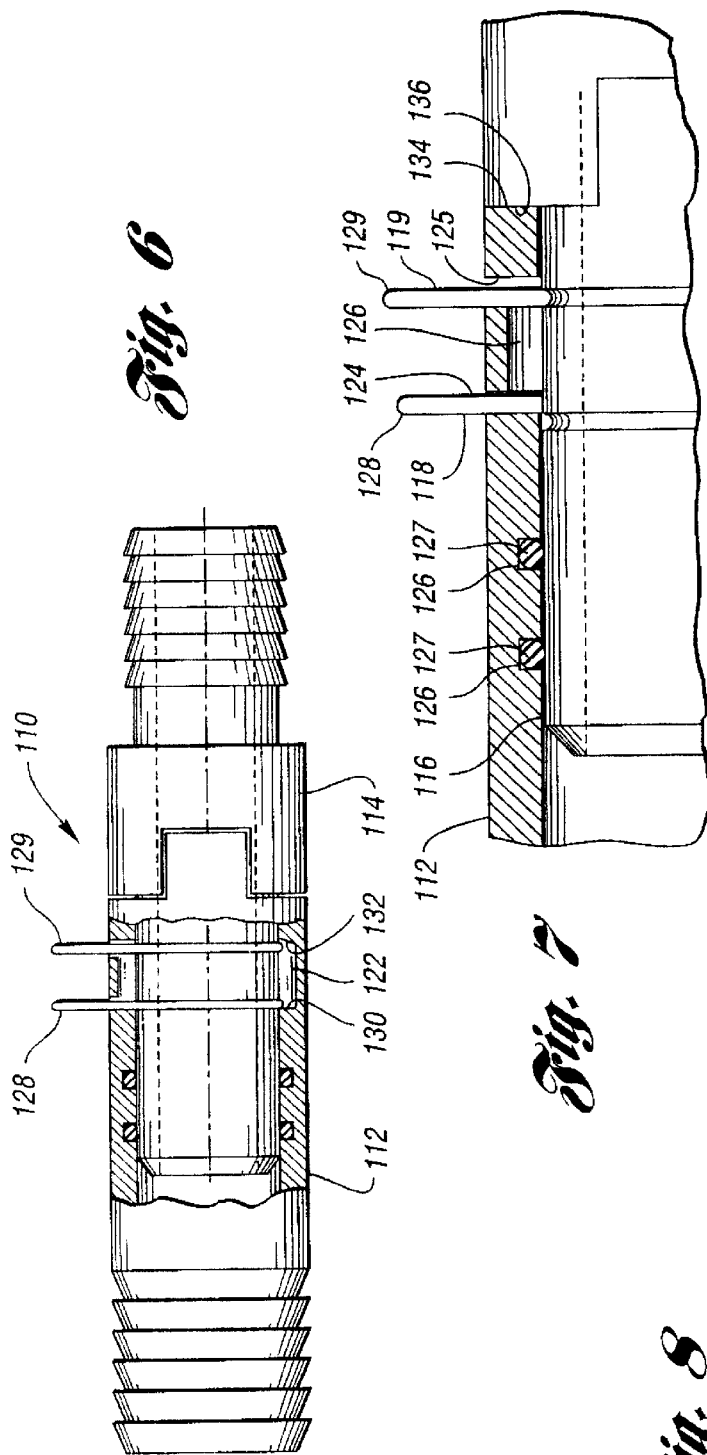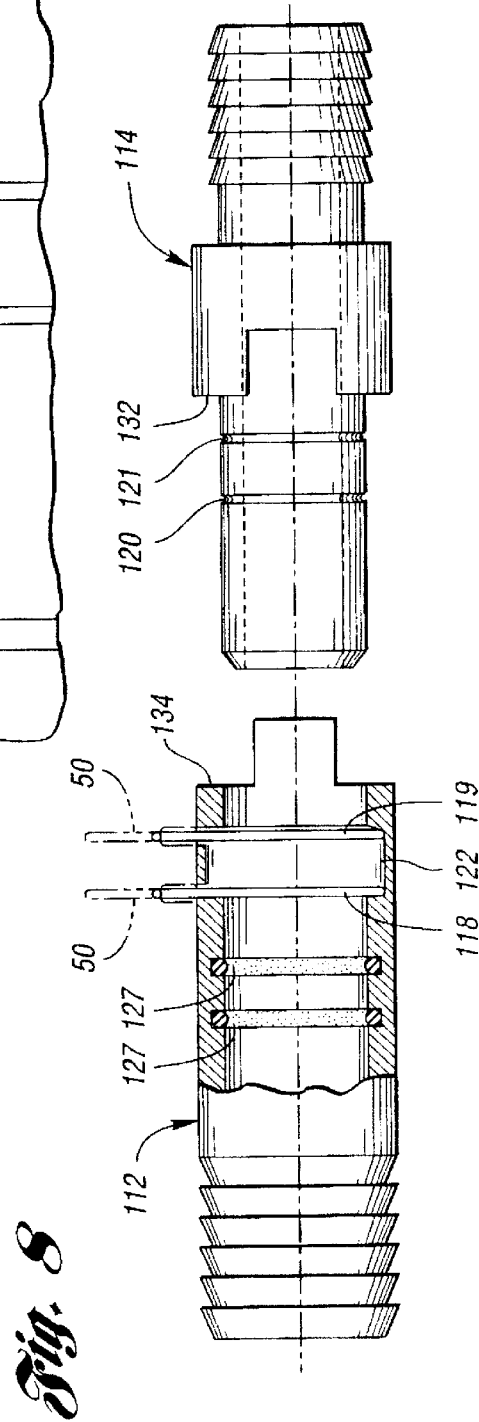

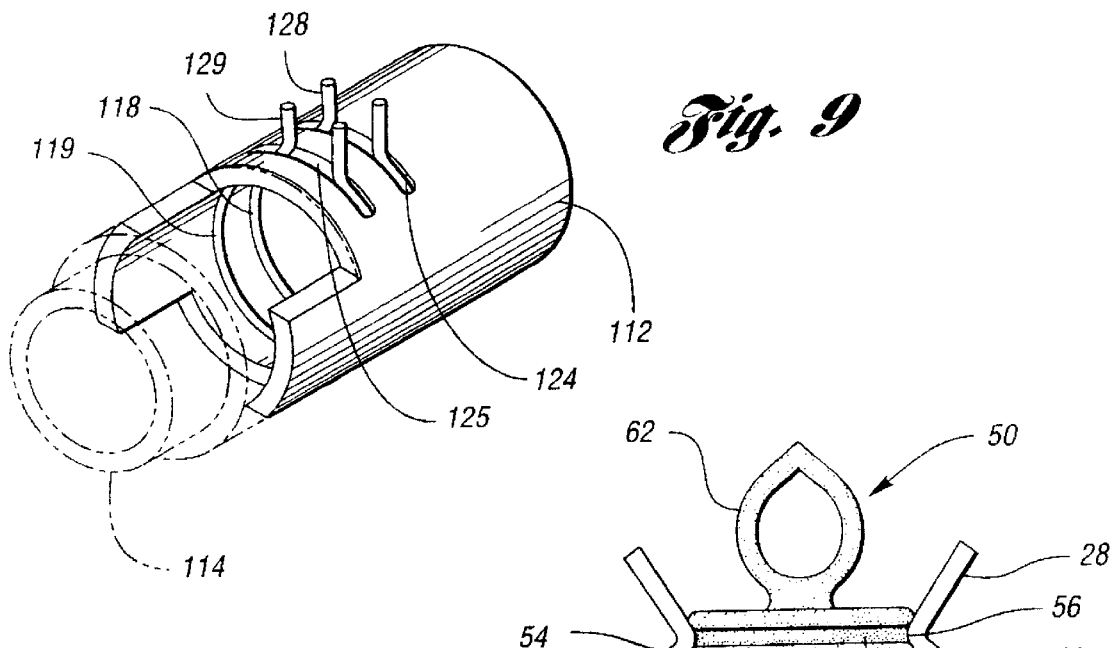
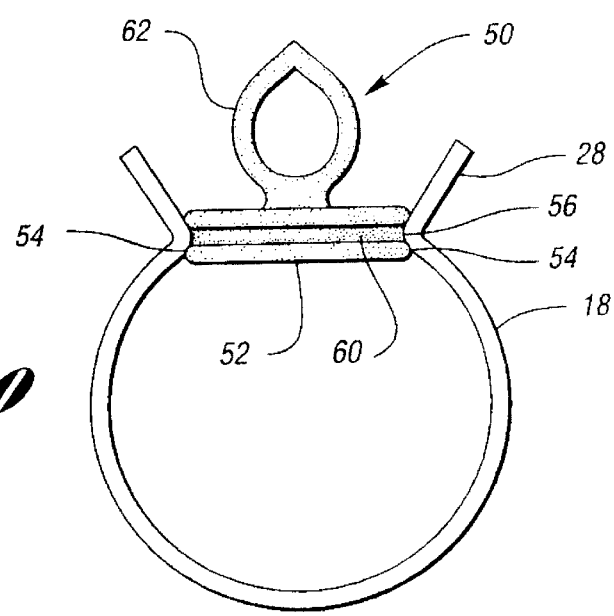
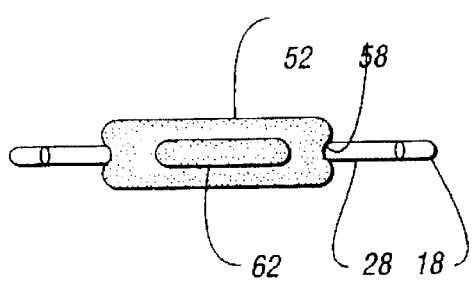
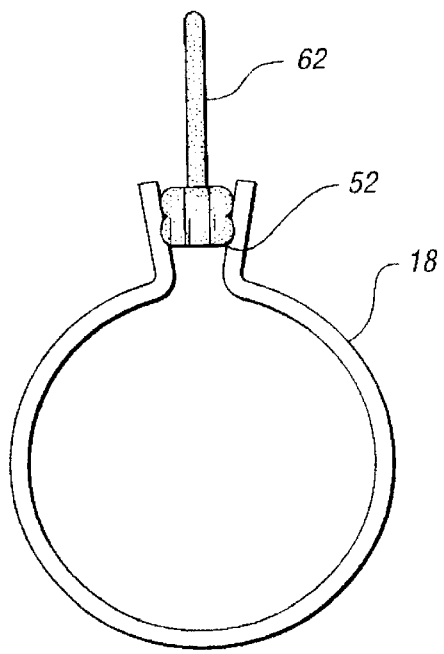

QUICK CONNECT/DISCONNECT CONNECTOR AND METHOD FOR USE

CROSS REFERENCE TO RELATED APPLICATIONS

This application claims priority from provisional application Ser. No. 60/001,726 filed Jul. 28, 1996 entitled "QUICK CONNECT/DISCONNECT CONNECTOR AND METHOD FOR USE."

TECHNICAL FIELD

This invention relates to connectors for joining telescopic members.

BACKGROUND OF THE INVENTION

It is often desirable to have a fluid coupling that can be easily and quickly connected or disconnected. Further, there are instances where the coupling should essentially prevent any relative movement between the members of the coupling during use.

SUMMARY OF THE INVENTION

An adjustable telescopic connector provided which is adapted to be force responsive, which includes male and female members which are positionable in telescopic relationship and configured to provide a gap between them to permit controlled axial movement.

In one embodiment, an expandable spring is provided between the two members which when positioned in a notch in the male member and not expanded has an engageable portion with a thickness that extends across the gap and is engageable with one of two cam portions to be received by a recess in the female member to restrict axial movement.

A second embodiment includes a pair of springs each having an engageable portion and a pair of notches in the male member. The female member has a recess with a shoulder portion and a cam portion so that when the springs in each of the notches, the spring respectfully engages a shoulder portion of the notch and a cam portion of the notch to maintain the members together with essentially no relative axial movement.

A method for maintaining telescopic members together is also described together with a spacer for this product.

BRIEF DESCRIPTION OF THE DRAWINGS

FIG. 1 is a cross-sectional view illustrating a coupling of the present invention;

FIG. 2 is an enlarged partial sectional view of the embodiment of FIG. 1;

FIG. 3 is a perspective view of a portion of the female member of the embodiment of FIG. 1 with the male member shown in phantom outline;

FIG. 4 is a locking ring used in the embodiment of FIG. 1;

FIG. 5 is an alternative embodiment of the locking ring;

FIG. 6 is a side partially cross-sectioned view of a second embodiment of the invention;

FIG. 7 is an enlarged partial sectional view of the recessed area of the female member of the embodiment of FIG. 6 where the male member is wholly inserted and the outer ring is released;

FIG. 8 is the male member and female member of the embodiment of FIG. 6 prior to insertion, the female member partially cut away and the locking rings open;

FIG. 9 is a perspective view of the female member of Exhibit 6 with the male member shown in phantom outline;

FIG. 10 shows a locking ring held open by a spacer;

FIG. 11 is a top view of the locking ring and spacer of FIG. 10;

FIG. 12 is a side view of a locking ring and spacer where the spacer is used as a gauge.

BEST MODE FOR CARRYING OUT THE INVENTION

A telescopic coupling 10 of the present invention as shown in FIG. 1 has a telescopically engaging female member 12 and male member 14 with a small radial gap 16 formed therebetween. Interposed between the female member 12 and the male member 14 is a spring 18 which functions as a locking ring. Preferably, the female member and male member are substantially circular in cross-section throughout the area where they telescopically interact. FIG. 1 shows a thin walled pipe that forms the male member 14 upon which is formed around its periphery notch 20 which preferably is roll formed and has a U-shaped cross-section It may alternatively have a rolled substantially rectangular cross-section. Additional spaced apart notches (not shown) may be formed on the male member 14 parallel to notch 20. Such additional notches will allow male member to be locked in place as described below so to change the effective length of the male member outside the coupling.

The female member 12 shown in FIG. 1 has a recess 22 extending around the internal surface. An opening 24 is made through the female member to allow communication from the outside of the female member to the recess as shown in FIGS. 1 and 3. Recess 22 has a substantially V-shaped cross-section formed by a pair of sloping camming surfaces 30 and 32.

The female member also has formed axially inwardly from the recess (i.e., away from the end the male member is inserted) a sealing cavity 26 extending around inner surface of the female member. A seal 27, preferably in the form of an O-ring, of sufficient size is positioned in the sealing cavity 26 so that when the male member is telescoped within the female member, the O-ring seal 27 will seal radial gap 16.

Locking ring 18 is substantially circular except that a pair of fingers 28 which extend outwardly from the spring as best shown in FIG. 4. When the locking ring 18 is positioned in recess 22, release fingers 28 are aligned with and passed through opening 24. The at rest position of the circular portion of the locking ring 18 has an inner diameter less than the outer diameter of the male member 14. This relationship acts to maintain the locking ring within notch 20 of the male member unless otherwise acted upon. To allow placement of the locking ring into or out of notch 20, the fingers on locking ring 18 are separated, expanding the locking ring 18 into recess 22 so as to create an effective interior diameter greater than the outer diameter of the male member.

The diameter or thickness of the locking ring 18 is greater than the depth of notch 20 and the width of the radial gap 16 combined. While the locking ring is in its at rest position in notch 20, the male member will be captured within the coupling by the recess. Attempted movement in either direction will cause the ring to abut and be fully seated in the notch by one of the camming surfaces 30 or 32 of recess 22 to prevent further movement. Thus, only limited axial movement defined by the spacing of camming surfaces 30 and 32 of recess 22 is permitted when the locking ring is in an at rest position in notch 20.

The female member 12 shown in FIG. 1 is a double ended connector having the sealing cavity 26', recess 22' and corresponding opening 24' and a second locking ring 18' to allow receipt and capture of a second male member from the other end of the female member.

The depth of recess 22 should be such as to allow the locking ring is opened to an effective interior diameter of the circular portion of the locking ring which is greater than the outer diameter of the male member. In other words, the depth of the recess plus the width of the radial gap 16 together should be greater than the diameter or thickness of the locking ring 18. Thus, to allow movement of the male member into or out of its locking relationship where the locking ring is released and seated within notch 20 the fingers 28 of the locking ring 18 are separated sufficiently so to create an interior diameter greater than the outer member of the male members to aid and allow easy positioning of the male member. Preferably, the depth of recess 22 should be greater than the diameter of thickness of the locking ring 18. This is to assure that the male member may be freed from the locking ring and moved without any likelihood of interference during movement of the male member when the fingers are separated and the locking ring is seated within recess 22.

FIG. 5 shows an alternative embodiment of locking ring 34 where the fingers cross. In this embodiment, the effective diameter of the locking ring is increased by moving the fingers 36 towards one another. The cross section of the locking ring may be varied together with the corresponding notch cross section. For example, the ring may have a square cross section in which case the notch is preferably to a corresponding rectangular cross section.

A second embodiment of the coupling is shown in FIGS. 6 through 9. In this embodiment, there is also a telescopic coupling 110 which has telescopically engaging female and male members 112, 114, with a radial gap 116 formed therebetween. In this embodiment, interposed between the female member 112 and the male member 114 are two springs 118 and 119. Each spring individually will act as a locking ring to prevent removal of the male member from the female member but together in cooperation they will prevent substantially any axial movement between the female and male member when in their locked positions. Preferably, the female member and male member are substantially circular in cross-section throughout the area where they telescopically interact.

FIG. 6 shows the coupling when both lock rings are acting to lock the members together. In this embodiment, the male member 114 has formed around the periphery a pair of spaced-apart notches 120, 121. Each notch preferably has a U-shape or semi-rectangular cross-section. The female member 112 shown in FIG. 6 has a recess 122 extending around its internal surface. A pair of circumferentially extending openings 124 and 125 are made through the female member to allow communication from the outside of the female member to the recess as shown in FIGS. 8 and 9. The recess includes a shoulder 130 which is at the innermost portion of the recess. The shoulder proceeds radially outwardly (i.e., at a right-angle to the inner surface) for a distance corresponding to a distance at least equal the diameter or thickness of locked ring 118 minus the width of the radial gap 116. Preferably it proceeds radially outward for at least a distance equal to the width or diameter of the locking ring. The recess cross-section may then proceed substantially parallel to the axis of the female member towards the forward end of the female member into which the male member is inserted. The cross-section then ramps back to the original internal diameter of the female member to form a camming surface 132.

The first or interior opening 124 is aligned adjacent to the shoulder of the recess so that when locking ring 118 is positioned in the opening it will move up and down the shoulder as the fingers are opened and released. The second or forward opening 125 is designed to allow limited axially movement of the locking ring positioned in the opening. The rearward edge 131 of forward opening 125 is positioned so that locking ring 119, positioned in the recess and with fingers opened, first contacts the camming surface 132 of the recess when the effective interior diameter of the locking ring is greater than the outer diameter of the male member. The opening 127 continues toward the forward end of the female member a sufficient distance so that the locking ring may be moved forwardly when released so that camming surface acts to force the locking ring into a fully seated position within notch 121 as shown in FIG. 6. The distance from the position on the ramping surface where the locking ring 119 is fully seated to the shoulder should essentially equal the distance between the two notches in the male member.

The female member also has formed inwardly from the recess (i.e., away from where the male member is inserted) a pair of sealing cavities 126 extending around the inner surface of the female member. Seals 127 preferably in the form of an O-ring of sufficient size is positioned in the sealing cavity 126 so that when the male member is telescoped within the female member the O-ring seals 127 will seal radial gap 116.

Locking rings 118 and 119 are substantially circular except that each has a pair of fingers 128 and 129 extend outwardly from the spring as best shown in FIG. 4. When the locking rings 118, 119 are positioned in their corresponding recess 122, 123 release fingers 128 and 129 are aligned with and passed through the corresponding opening 124, 125. The at rest position of the circular portion of the locking rings have an inner diameter less than the outer diameter of the male member 114. This relationship acts to maintain the locking ring within notches of the male member unless otherwise acted upon. To allow placement of the locking ring into or out of a notch, the fingers on locking ring are separated so to create an effective interior diameter greater than the outer diameter of the male member.

The diameter or thickness of the locking rings 118, 119 are greater than the depth of the corresponding notch 120, 121 respectively and the width of the radial gap 16 combined. Thus, while the locking rings are in its at rest position in the corresponding notch 120, 121, the male member will be captured within the coupling by the recess since attempted movement in either direction will cause the ring to abut and be fully seated in the notch by either the shoulder 130 or the camming surface 132 of recess 122 to prevent further movement in that direction.

To insert and lock the male member 114 into the female member 112 of the second embodiment, the user would first position each locking ring in the recess 122 with their fingers positioned through their respective opening.

Both rings are then opened to an effective diameter greater than the male member by moving their fingers, as shown in FIG. 8. The male member is inserted into the female member so that its first notch 120 is moved past the shoulder 130, at which point the fingers of the locking ring 119 are released so the locking ring attempts to move to its at rest position. The male member is then positioned so that locking ring 119 enters into notch 121, as shown in FIG. 7.

Locking ring 118 is then released. The male member is pulled outwardly until locking ring 118 enters into notch 130, at which point the male member should be prevented from essentially any further outward movement due to locking ring 119 being captured in its fully seated position in notch 121 and camming surface 132, as shown in FIG. 6.

To aid in controlling the initial insertion of the male member into the female member, the second embodiment of the male member includes an abutment 134 which interacts with the forward surface of the female member 136. When the abutment and forward surfaces meet, the male member has entered the female member sufficiently to allow ring 119 to be released, as shown in FIG. 7.

To ease the use of the couplings, there is also provided, as shown in FIGS. 10–12, a spacer 50. The spacer is intended to hold the locking ring in a position where its effective inner diameter is greater than the outer diameter of the male member. Though for ease of showing, FIGS. 10–12 show the spacer's relationship to the locking ring apart of the female member, the spacer is intended to be used when the locking rings are properly positioned within the female member.

The spacer includes a body 52. When used with the type of locking ring 18 where the fingers are separated to open the ring, the ends 54 of the locking ring will have detentes 56 designed to capture a portion of each finger of the locking ring and separate them a distance sufficient to form an effective diameter of the locking ring's circular portion so that it maintains an effective inner diameter greater than the male member. In this particular embodiment of the locking ring, there is an indentation 58 on the ends parallel to the sides which works cooperatively with a second notch 60 that extends around the body of the spacer parallel its bottom. Where the two notches intersect at each end, there is a sufficient detent 56 to securely hold the locking ring in its open position. The spacer further has extending from its upper surface a tab 62 to allow the spacer to be easily grasped so that it can be removed from the ring.

To understand how the spacers might be used, the second embodiment of the connector would be normally shipped with both rings 118 and 119 in place, each of which being maintained in their open position by a spacer. This avoids the need for someone who might be inexperienced in the field from having to try to make the initial placements of the rings within the female member. An experienced assembler at the factory where the female member is made can essentially lock the springs in position in their open position by using the spacer. If the factory person puts the rings in their correct spot without a spacer due to their being in their relaxed position, they may slide out of the openings during transit.

Once it is desired to use the coupling, the male member is inserted as described above into the female member. The spacer for ring 119 is then released to allow for its positioning within notch 121. After ring 119 is positioned, the spacer for ring 118 is then pulled from the ring to allow placement of that ring within notch 120.

The spacer can also be used as a gauge by having its width be of such a size that it is slightly greater than the opening between the fingers at a predetermined location along the fingers when the fingers have taken their position within their respective notches. In this manner, the spacer may be inserted between the fingers as shown in FIG. 12 and the user will know that if the spacer contacts both fingers prior to the predetermined spot which should be no deeper than the location corresponding to the outer surface of the female member, the ring has been successfully seated. If the spacer continues further than it should between the fingers, this is an indication to the user to move the male and female members so to encourage a correct seating of the ring.

What is claimed is:

1. A telescopic connector adapted to be force responsive comprising;

a male member and a female member which are positionable in telescopic relation and configured to provide a gap therebetween sufficient to allow relative axial movement;

said female member having a recess in communication with said gap, the recess having a shoulder portion and a cam portion axially separated from the shoulder portion away from the female member telescoping end;

said male member having a pair of notches which are axially separated a distance corresponding to the distance between the female shoulder and cam portions;

a positioning device for selectively joining said members to prevent substantially any movement between the said members when in a locked position, but which will not restrict axial movement between the member when in an unlocked position;

said positioning device having a pair of engageable spring portions between said members corresponding to and seatable within each of the notches, each of said engageable portions having a thickness which when seated in the corresponding notch will span the gap so to be engageable with the shoulder portion and cam portion of the recess, each of the engageable spring portions having a release finger operable to expand the engageable spring portions away from the male member;

the locking position of the positioning device characterized by each engageable spring portion being not expanded and within its corresponding notch; and the unlocked position of the positioning device characterized by each engageable spring portion being expanded and not within its corresponding notch.

2. A telescopic connector of claim 1 wherein the release finger for the engageable spring portion within the notch corresponding to the female cam portion will not be operable to expand the engageable portion away from the male member when the other expandable spring portion is within the notch corresponding to the female shoulder portion.

3. A telescopic connector comprising;

a male member and a female member which are positionable in telescopic relation and configured to provide a gap therebetween sufficient to allow relative axial movement;

said female member having a recess in communication with said gap, the recess having a shoulder portion and a cam portion axially separated from the shoulder portion;

said male member having a pair of notches which are axially separated a distance corresponding to the distance between the female shoulder and cam portions, the first of said notches corresponding to the female shoulder portion and the second of said notches corresponding to the female cam portion;

a first expandable spring having an engageable portion between said members seatable within the first notch and two ends, at least one of said ends connecting to a release finger, the release finger being operable to expand the engageable portion of the spring away from the male member;

a second expandable spring having an engageable portion between said members seatable within the second notch and two ends, at least one of second expandable spring ends connecting to a release finger, the release finger being operable to expand the engageable portion of the spring away from the male member when the engageable portion of the first spring is not in the first notch;

said engageable portion of the first spring engaging the female shoulder portion when in the first notch and the engageable portion of the second spring engaging the female cam portion when in the second notch to maintain the members together with essentially no relative axial movement, and the engageable portions when both expanded allowing relative axial movement of the members.

4. A method for maintaining a male member with a telescopic end and a first and second notches and a female member with an end for receiving the male telescopic end and a recess, which are configured to provide a gap therebetween sufficient to allow normally allow relative axial movement, in a relative telescopic relation with essentially no axial movement allowed, comprising the steps of:

positioning in the recess adjacent a shoulder portion of the recess a first expandable spring having an engageable portion between said members seatable within the first notch and two ends, the engageable portion having a thickness that spans the gap when the engageable member is in the first notch to allow it to abut the shoulder portion, at least one of said ends connecting to a release finger, the release finger being operable to expand the engageable portion of the spring away from the male member;

positioning in the recess adjacent a cam portion of the recess, which is axially separated from the shoulder portion a distance corresponding to the distance between the notches in the direction of the receiving end, a second expandable spring having an engageable portion between said members seatable within the second notch and two ends, at least one of said ends connecting to a release finger, the engageable portion having a thickness that spans the gap when the engageable member is in the second notch to allow it to abut the cam portion, the release finger being operable to expand the engageable portion of the spring away from the male member when the engageable portion of the first spring is not in the first notch;

inserting said male member into the female member while both release fingers are operated to expand the engageable portions sufficiently to allow free passage of the male members through the engageable portions until the first notch is past the shoulder, releasing the finger of the second engageable portion, withdrawing the male member until the engageable portion of the second spring enters the second notch and then abuts a portion of the cam portion; and releasing the finger of the first engageable portion and positioning the engageable portion of the first spring into the first notch.

* * * * *